(12) United States Patent
Young

(10) Patent No.: US 6,934,770 B1
(45) Date of Patent: Aug. 23, 2005

(54) METHOD FOR ABORTING DATA TRANSFER COMMANDS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 213 days.

(21) Appl. No.: 10/429,005

(22) Filed: May 1, 2003

(51) Int. Cl.[7] .................................................. G06F 3/00
(52) U.S. Cl. ............................................ 710/5; 710/24
(58) Field of Search ................................ 710/5, 15, 19, 710/24, 30, 32; 711/146

(56) References Cited

U.S. PATENT DOCUMENTS

| | | | | |
|---|---|---|---|---|
| 5,630,094 A | * | 5/1997 | Hayek et al. ................ | 711/146 |
| 5,797,034 A | * | 8/1998 | Young .......................... | 710/24 |
| 5,923,896 A | * | 7/1999 | Young .......................... | 710/5 |
| 6,115,796 A | * | 9/2000 | Hayek et al. ................ | 711/146 |

* cited by examiner

Primary Examiner—Jeffrey Gaffin
Assistant Examiner—Harold Kim
(74) Attorney, Agent, or Firm—Gunnison, McKay & Hodgson, L.L.P.; Forrest Gunnison

(57) ABSTRACT

A single hardware I/O control block is used to efficiently abort a target I/O command for a target I/O device, e.g., one target I/O device in a plurality of target I/O devices. The abort command is included in the same hardware I/O control block that specified the target I/O command to be aborted. Execution of both the target I/O command and the abort command returns only one hardware I/O control block pointer and generates only one interrupt to a host system when both the target I/O command and the abort command are completed. All time relationships between the execution of the abort command and execution of the original target I/O command are supported. There are no holes where the abort command is lost or where the host system is advised of target I/O command completion prematurely, or is not advised of completion at all.

25 Claims, 4 Drawing Sheets

METHOD FOR ABORTING DATA TRANSFER COMMANDS

BACKGROUND OF THE INVENTION

1. Field of the Invention

The present invention relates generally to host adapters that interface two I/O buses, and more particularly to aborting data transfer commands sent to a host adapter.

2. Description of Related Art

Host adapter integrated circuits were widely used for interfacing two I/O buses such as a host computer I/O bus and a SCSI bus. A software manager executing on the host computer generated commands that requested storage and retrieval of data. The commands were delivered to a host adapter that in turn routed the commands to the appropriate target I/O devices.

Occasionally, the software manager needed to abort a data transfer command before the command had been completed. For example, the data requested from a target I/O device was no longer needed, or execution of the command had exceeded a maximum time limit imposed by the software manager. When the software manager needed to abort a data transfer command, the software manager sent a second hardware control block that requested the host adapter abort the specified data transfer command.

An abort command was effectively a second command to be managed by the host adapter concurrently with the first command that requested the data transfer. Both commands related to the same operation that was executed by a target I/O device.

Abort commands were difficult to execute, because abort commands were completely asynchronous with the execution of the first command. A host adapter received an abort command at any time from before the host adapter had received the first command, i.e., the original command block containing the command, until after the host adapter had completed execution of the first command.

Execution of the abort command was further complicated because the behavior of the target I/O device, in response to the abort command, was unpredictable. After the first command was transferred to the target I/O device, the target I/O device was in control of how execution of the first command proceeded. The target I/O device could continue executing the first command, or the target I/O device could enable the host adapter to abort execution of the first command. If the target device continued executing the first command, the target I/O device prevented the host adapter from delivering the abort command to the target I/O device. Thus, the management of abort commands by the host adapter was complex and could require significant resources.

SUMMARY OF THE INVENTION

According to one embodiment of the present invention, a single hardware I/O control block is used to efficiently abort a target I/O command for a target I/O device, e.g., one target I/O device in a plurality of target I/O devices. In this embodiment, the abort command is included in the same hardware I/O control block that specified the target I/O command to be aborted.

Execution of both the target I/O command and the abort command returns only one hardware I/O control block pointer and generates only one interrupt to a host system when both the target I/O command and the abort command are completed. All time relationships between the execution of the abort command and execution of the original target I/O command are supported in this embodiment. There are no holes where the abort command is lost or where the host system is advised of target I/O command completion prematurely, or is not advised of completion at all.

In another embodiment, a host adapter receives a hardware I/O command block including a target I/O command for a target I/O device. The hardware I/O command block is modified to include an abort command after the hardware I/O command block is received. The hardware I/O command block is scheduled for execution by the host adapter following the modifying. The modifying of the hardware I/O command block does not affect information in the hardware I/O command block for the target I/O command.

In one embodiment, the modifying is performed by a host adapter manager executing on a host system. In another embodiment, the modifying is performed by a sequencer of the host adapter.

In this embodiment of the method, the host adapter determines whether both the abort command and the target I/O command have completed by checking a state of a flag in the hardware I/O command block. The host adapter notifies a host system of completion of both the abort command and the target I/O command when the flag has an asserted state. The flag is asserted only following completion of execution of both the abort command and the target I/O command when the hardware I/O command block includes both commands.

In still another embodiment, a done flag in a hardware I/O control block, which includes a target I/O command, is configured to a first state where the first state indicates the target I/O command has not been executed by a host adapter. The hardware I/O control block also is configured to include an abort command for the target I/O command. Thus, the hardware I/O control block includes both the target I/O command and the abort command.

In this embodiment, when the original target I/O command is to be aborted, the done flag is configured to a second state only upon completion of the target I/O command and the abort command.

In still yet another embodiment, a method includes:
  determining whether a hardware I/O command block including a target I/O command to be aborted is in a host adapter execution queue;
  removing the hardware I/O command block from the execution queue upon the determining finding that the hardware I/O command block is in the host adapter execution queue; and
  determining a state of a done flag in the hardware I/O command block upon the determining finding that the hardware I/O command block is not in the host adapter execution queue.

The method also includes in this embodiment:
  modifying the hardware I/O command block to include an abortion command for the target I/O command upon the determining the state of the done flag finding that the done flag is unasserted.

A method for aborting an I/O target command, in another embodiment, includes using a single hardware I/O command block structure for both a target I/O command and an abortion command for the target I/O command. The method also asserts a done flag in the single hardware I/O command block structure when both the target I/O command and the abortion command for the target I/O command are completed.

BRIEF DESCRIPTION OF THE DRAWINGS

In the figures, elements with the same reference numeral are the same or similar elements. The first digit of a reference numeral for an element indicates the figure in which that element first appears.

DETAILED DESCRIPTION

Figure 1:
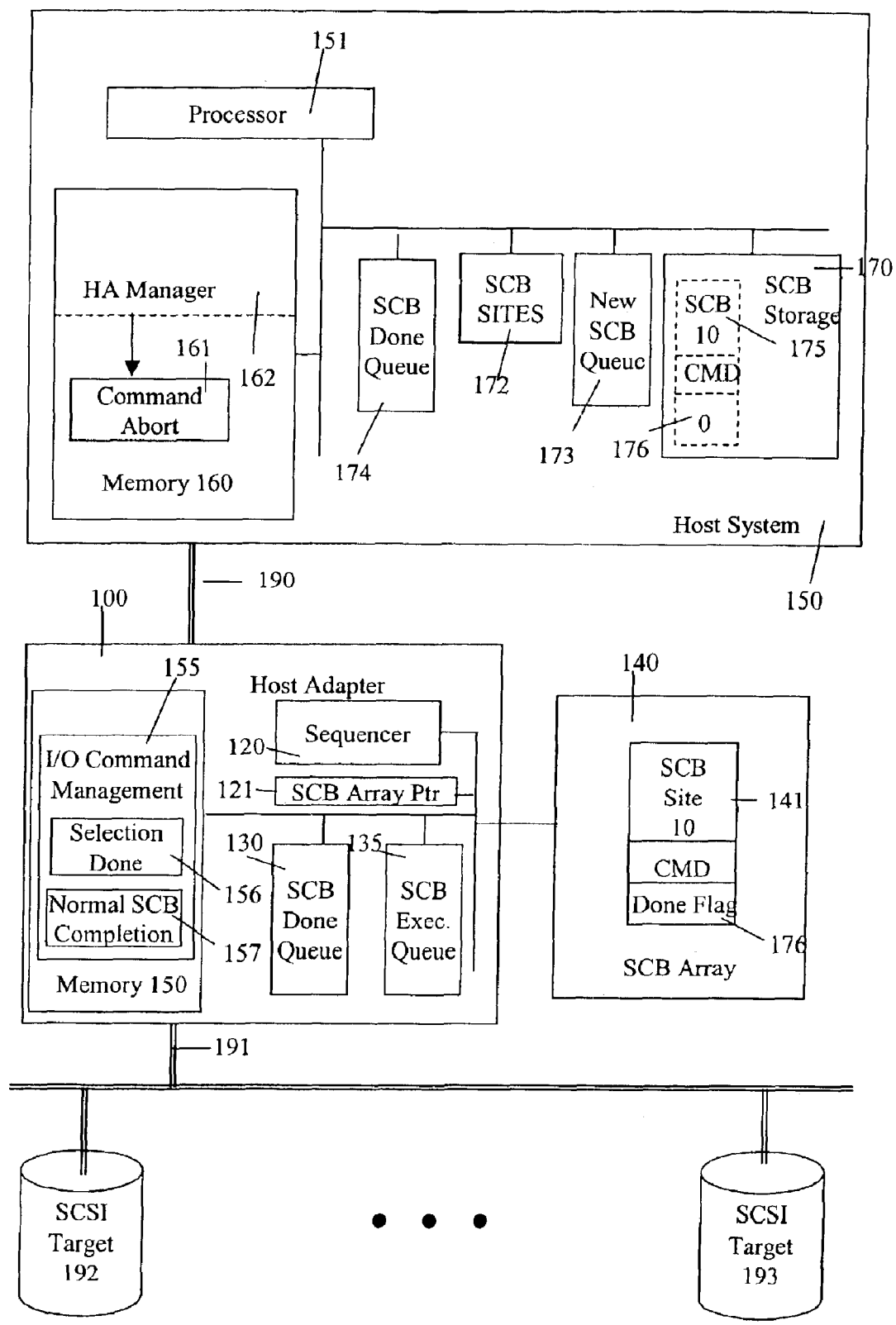
FIG. 1 is a block diagram of a system, including host system, a host adapter integrated circuit coupled to the host system, and a plurality of target I/O device coupled to the host adapter integrated circuit, which aborts target I/O commands according to one embodiment of the present invention.

According to one embodiment of the present invention, a host adapter integrated circuit 100, in cooperation with a host adapter manager 162 executing on a host system 150, utilizes a single hardware I/O control block to efficiently abort a target I/O command for a target I/O device, e.g., one target I/O device in a plurality of target I/O devices 192, 193. In this embodiment, the abort command is included in the same hardware I/O control block that specified the target I/O command to be aborted.

Execution of both the target I/O command and the abort command returns only one hardware I/O control block pointer and generates only one interrupt to host system 150 when both the target I/O command and the abort command are completed. As used herein, completed means execution of the command has been successfully halted.

Host adapter 100 does not notify host system 150 that the original target I/O command and the abort command are completed until the target I/O device has terminated execution of the original target I/O command, all data transfers to host system 150 associated with the original target I/O command, sometimes called a data transfer command, are terminated, and host adapter 100 has terminated execution of both the original target I/O command and the abort command. Thus, host system 150 is not notified until host adapter 100 has completed processing of the hardware I/O control block or hardware control blocks containing the two commands.

All time relationships, between the execution of the abort command and execution of the original target I/O command are supported in this embodiment. There are no holes where the abort command is lost or where host system 150 is advised of target I/O command completion prematurely, or is not advised of command completion at all.

In one embodiment, a sequencer 120 of host adapter 100 is executing an I/O command management module 155 when host adapter manager 162 receives a request to abort a data transfer. In response to the abort data transfer request, host adapter manager 162 determines the hardware I/O command block, sometimes called a sequencer control block (SCB), associated with the abort data transfer request, which in this example is SCB 141, and executes a command abort module 161 as a command abort process 261 (See FIG. 2) that is described more completely below.

Command abort process 261, in one embodiment, interrupts the execution of I/O command management module 155 by sequencer 120, and checks a state of a done flag 176 in SCB 141. If done flag 176 has a second state, e.g., asserted, indicating that target I/O command CMD in SCB 141 has completed execution, process 261 allows resumption of execution of I/O command management module 155. If done flag 176 has a first state, e.g., unasserted, indicating that target I/O command CMD in SCB 141 has not completed execution, command abort process 161 modifies SCB 141 to select target I/O device 192, and to direct target I/O device 192 to abort execution of target I/O command CMD of SCB 141. Upon completing the modification of SCB 141, process 261 allows I/O command management process 155 to resume execution.

Upon resumption of execution of I/O command management module 155, the state of done flag 176 is checked upon completion of target I/O command CMD in SCB 141. If done flag 176 has the second state, execution of target I/O command CMD of SCB 141 is terminated without reporting completion to host adapter manager 162. In this case, the abort command has been delivered to target I/O device 192 for execution.

If done flag 176 has the first state, the execution of I/O command management module 155 changes done flag 176 to the second state and then checks SCB 141 to determine whether SCB 141 has been modified to be an abort SCB. If SCB 141 is an abort SCB, the state of done flag 176 is changed back to the first state and execution of target I/O command CMD is terminated without reporting completion. If SCB 141 is not an abort SCB, execution of target I/O command CMD continues normally. When and only when all activity associated with SCB 141 is completed and done flag 176 has the second state, completion of target I/O command CMD is reported to host adapter manager 162.

When a target I/O device is selected, e.g., target I/O device 192, execution of I/O command management module 155 by sequencer 120 determines whether the last command send to target I/O device 192 was from an abort SCB. If the SCB is an abort SCB, done flag 176 is asserted, and otherwise processing continues as in the prior art.

Thus, the abort operation has been managed using the same hardware I/O control block that specified the target I/O command to be aborted. Only one hardware I/O control block pointer is returned and only one interrupt to host system 150 is generated after both the target I/O command and the abort command are terminated, i.e., only after the done flag is asserted, e.g., in this example has the second state, and any in progress data transfer associated with the SCB is completed.

In one embodiment, a sequencer control block 175 is generated in host memory 170 by host adapter manager 162. Sequencer control block (SCB) 175 contains all the original information used to specify a data transfer with a first target I/O device in a plurality of target devices 192, 193 on I/O bus 191. In FIG. 1, the target I/O bus is a SCSI bus and the target I/O devices are SCSI devices. However, this is illustrative only and is not intended to limit the invention to a SCSI bus and SCSI target devices.

The original information in SCB 175 is not affected by this embodiment of the invention. In addition, SCB 175 includes a done flag 176, which in this embodiment, is initialized to a de-asserted state, e.g., initialized to a first state. After done flag 176 is initialized by host adapter manager 162, host adapter manager 162 only observes the state of done flag 176. Following initialization, done flag 176 is asserted and de-asserted only by host adapter 100.

Figure 2:
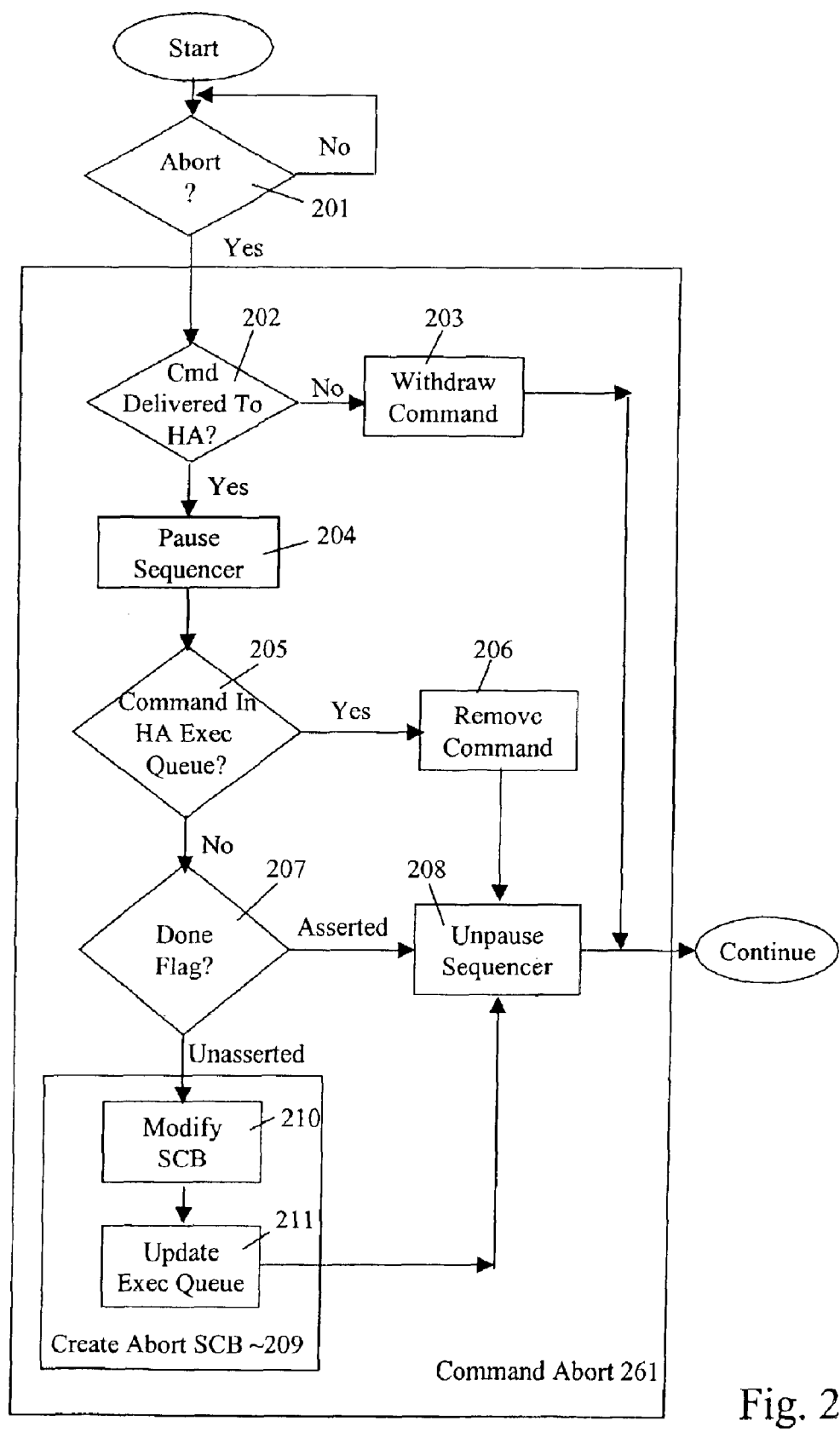
FIG. 2 is a process flow diagram for a command abort process according to one embodiment of the present invention.

A pointer to SCB 175 is placed in new SCB queue 173 that is also in host memory. The SCB is transferred, as in the prior art, from memory 170 to SCB array 140 and a pointer to SCB 141 is placed in SCB execution queue 135. Only a single hardware I/O control block is moved from host system 150 to host adapter 100 for both the original command CMD and the abort command, in this embodiment. When host adapter manager 162 receives a request to abort a data transfer, host adapter manager 162 determines the SCB associated with the data transfer and launches command abort process 261 (FIGS. 1 and 2). In FIG. 2, this is illustrated by abort check operation 201.

Check operation 201 is illustrative only and is not intended to limit the invention to this particular embodiment. For example, host adapter manager 162 need not repeatedly poll in abort check operation 201. An event may occur that notifies host adapter manager 162 that an abort operation has been requested, and host adapter manager 162 responds to this event. Hence, check operation 201 is intended only to show that host adapter manager 162 does not initiate command abort process 261 until host adapter manager 162 determines whether an abort operation has been requested by whatever means are used in a particular application of this embodiment of the present invention.

Command delivered to host adapter check operation 202 determines whether the SCB to be aborted has been delivered to host adapter 100. In the embodiment of FIG. 1, host adapter check operation 202 determines whether there is a pointer to the SCB in new SCB queue 173, e.g., a pointer to SCB 175. If there is a pointer to the SCB in new SCB queue 173, check operation 202 transfers to withdraw command operation 203 because the SCB has not been delivered to host adapter 100, and otherwise transfers to pause sequencer operation 204 because the SCB has been delivered to host adapter 100.

Withdraw command operation 203 deletes the pointer from new SCB queue 173 and does any other necessary cleanup. Since the SCB had not been delivered to host adapter 100, the abortion of the SCB did not require communication with host adapter 100.

However, if the SCB has been delivered to host adapter 100, host adapter manager 162 must determine whether host adapter 100 has started execution of target I/O command CMD in SCB 141. (Herein, SCB 141 and SCB 175 are the same SCB, but different reference numerals are used to help clarify whether the SCB is host memory or the SCB in host adapter memory is being described.) In this embodiment, host adapter manager 162 pauses operation of sequencer 120 in pause sequencer operation 204. This prevents contentions on host adapter buses and possible race conditions that could result if sequencer 120 continued operation while host adapter manager 161 determined the status of SCB 141.

Pause sequencer operation 204 transfers processing to command in host adapter execution queue check operation 205. If host adapter 100 has started execution of SCB 141, a pointer to SCB 141 in SCB execution queue 135 has been removed. Conversely, if host adapter 100 has not started execution of SCB 141, a pointer to SCB 141 is in SCB execution queue 135.

Thus, in this embodiment, command in host adapter execution queue check operation 205 determines whether SCB 141 is in SCB execution queue 135, e.g., is there a pointer to SCB 141 in SCB execution queue 135. If SCB 141 is in SCB execution queue 135, processing transfers to remove command 206 and otherwise transfers to done flag check operation 207.

Remove command operation 206 removes SCB 141 from SCB execution queue 135 and transfers to unpause sequencer operation 208. Unpause sequencer operation 208 unpauses sequencer 120 and sequencer 120 resumes execution.

Thus, if the SCB for the data transfer that is to be aborted either has not been transferred to host adapter 100, or has been transferred to host adapter 100 and execution of the SCB has not been started by host adapter 100, host adapter manager 162 removes the SCB. This effectively aborts the SCB.

If host adapter 100 has removed SCB 141 from queue 135 and execution has progressed to the point that the SCB will not be re-appended to execution queue 135, command abort process 261 reaches done flag check operation 207. Done flag check operation 207 reads the state of done flag 176 in SCB 141.

If done flag 176 is asserted, SCB 141 has completed normal execution, and host adapter manager 162 is notified in due course, as described more completely below. Host adapter manager 162 takes an appropriate action upon receipt of that notification. In this case, execution of SCB 141 completed before host adapter 162 could initiate the abort operation. Hence, check operation 207 transfers processing to unpause sequencer operation 208 that was described above.

If the done flag is unasserted, execution of SCB 141 is ongoing and processing transfers from done flag check operation 207 to create abort SCB operation 209. Create abort SCB operation 209 modifies SCB 141 to make SCB 141 an abort SCB and queues the abort SCB for execution.

Specifically, in one embodiment of modify SCB operation 210, a task attribute field and a task management field in SCB 141 are modified to command the abort. These fields are defined in the Packetized SCSI Protocol for the L_Q information unit sent to a target. All other fields in SCB 141 are left unaltered for possible continuation of execution of target I/O command CMD. Modify SCB operation 210 transfers to update execution queue operation 211.

In update execution queue operation 211, host adapter manager 162 appends SCB 141 to execution queue 135. In one embodiment, SCB 141 is inserted at the head of the queue for the specified SCSI target. Optionally, host adapter manager 162 removes any other remaining SCBs for the specified SCSI target from execution queue 135. Upon completion, operation 211 transfers processing to unpause sequencer operation 208 that was described above.

At this point, SCB 141 has a split personality. At the same time, SCB 141 is a normal SCB and an aborting SCB. As a normal SCB, SCB 141 is used to continue execution of target I/O command CMD, if the specified target I/O device continues execution of target I/O command CMD. As an aborting SCB, SCB 141 causes the selection again of the specified target I/O device, and the aborting of target I/O command CMD. By definition, a SCB has the aborting personality and the normal personality when the task attribute and task management fields of the SCB specify that the original target I/O command is to be aborted.

After operation 211 updates execution queue 135 for the specified target I/O device and operation 208 unpauses sequencer 120, sequencer 120 removes SCB 141 from queue 135, executes SCB 141, and selects the specified target device for transfer of the abort command. For example with the Packetized SCSI Protocol, an Abort L_Q information unit is sent to the specified target I/O device specifying the particular command, e.g., command CMD, to be aborted. If the target I/O device has already completed execution of command CMD, no harm is done by sending the command to abort execution.

While the above embodiment described host adapter manager 162 as performing command abort process 261, in another embodiment, operations in process 261 that are associated with checking the host adapter execution queue, checking the state of the done flag, and creating an abort SCB are carried out by sequencer 120. Alternatively, these operations can be split between host adapter manager 162 and host adapter 100.

Figure 3:
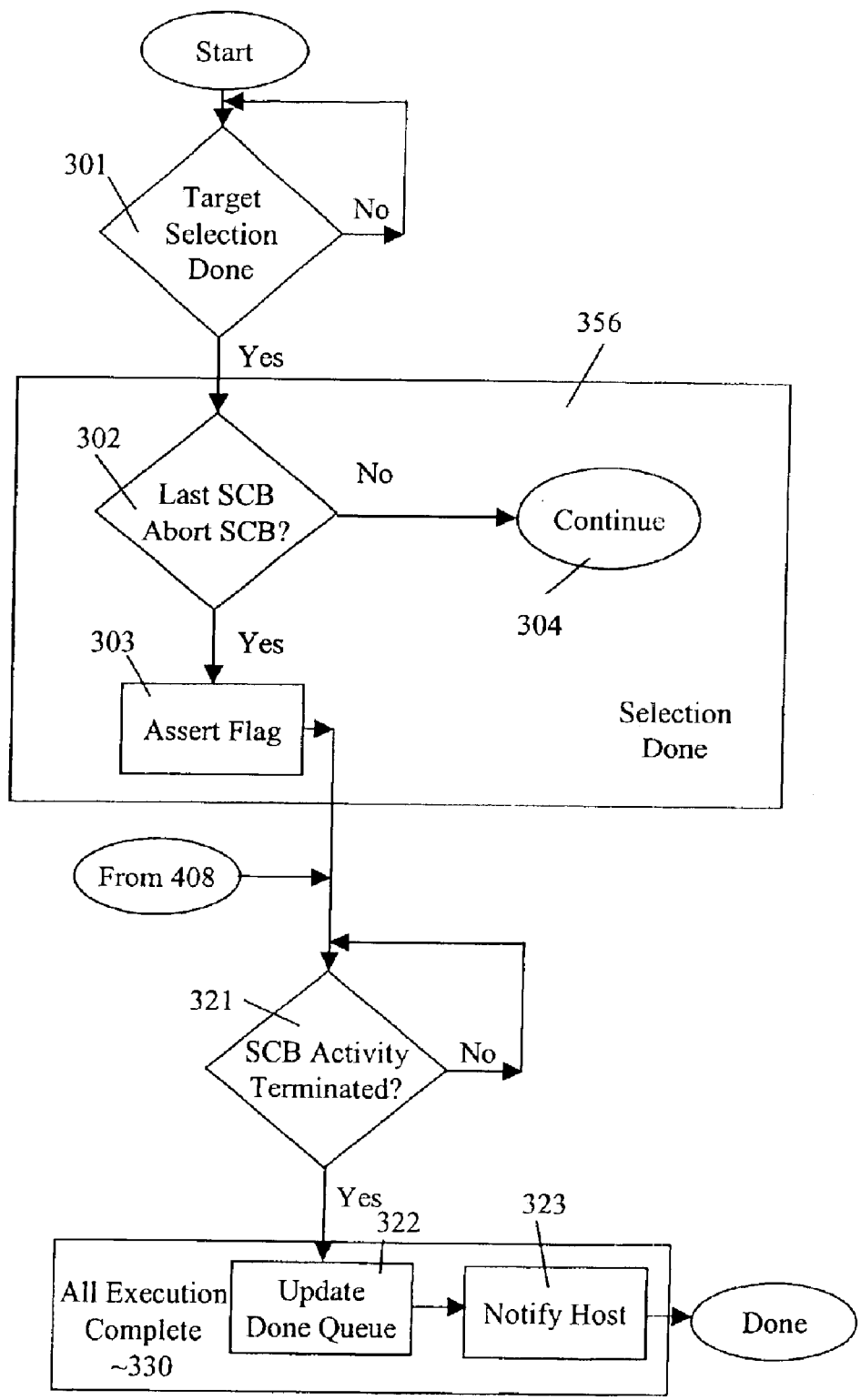
FIG. 3 is a process flow diagram for a selection done process according to one embodiment of the present invention, and for an all execution complete process according to one embodiment of the present invention.

Following every target selection, the selection done status is set in host adapter 100, and sequencer 120 executes selection done process 356 (FIGS. 1 and 3). In FIG. 3, target selection done check operation 301 is used to indicate that selection done process 356 is not called until the selection done status is set.

In last SCB an abort SCB check operation 302, sequencer 120 checks the SCB, e.g., SCB 141, representing the last transfer to target I/O device 192 for which selection was completed. The transfer can be, for example, a SCSI CDB command block in which case SCB 141 is not an aborting SCB, or the Abort L_Q information unit in which case SCB 141 is an aborting SCB. If SCB 141 is an aborting SCB, check operation 302 transfers to assert flag operation 303 and otherwise transfers to continue 304.

In assert flag operation 303, done flag 176 in SCB 141 is asserted to indicate that execution of SCB 141 has been aborted. Upon completion, operation 303 transfers processing to SCB activity terminated check operation 321. There may other operations in selection done process 356, but these operations would be equivalent to those in the prior art and so are not included in FIG. 3 to avoid detracting from this embodiment of the invention.

Figure 4:
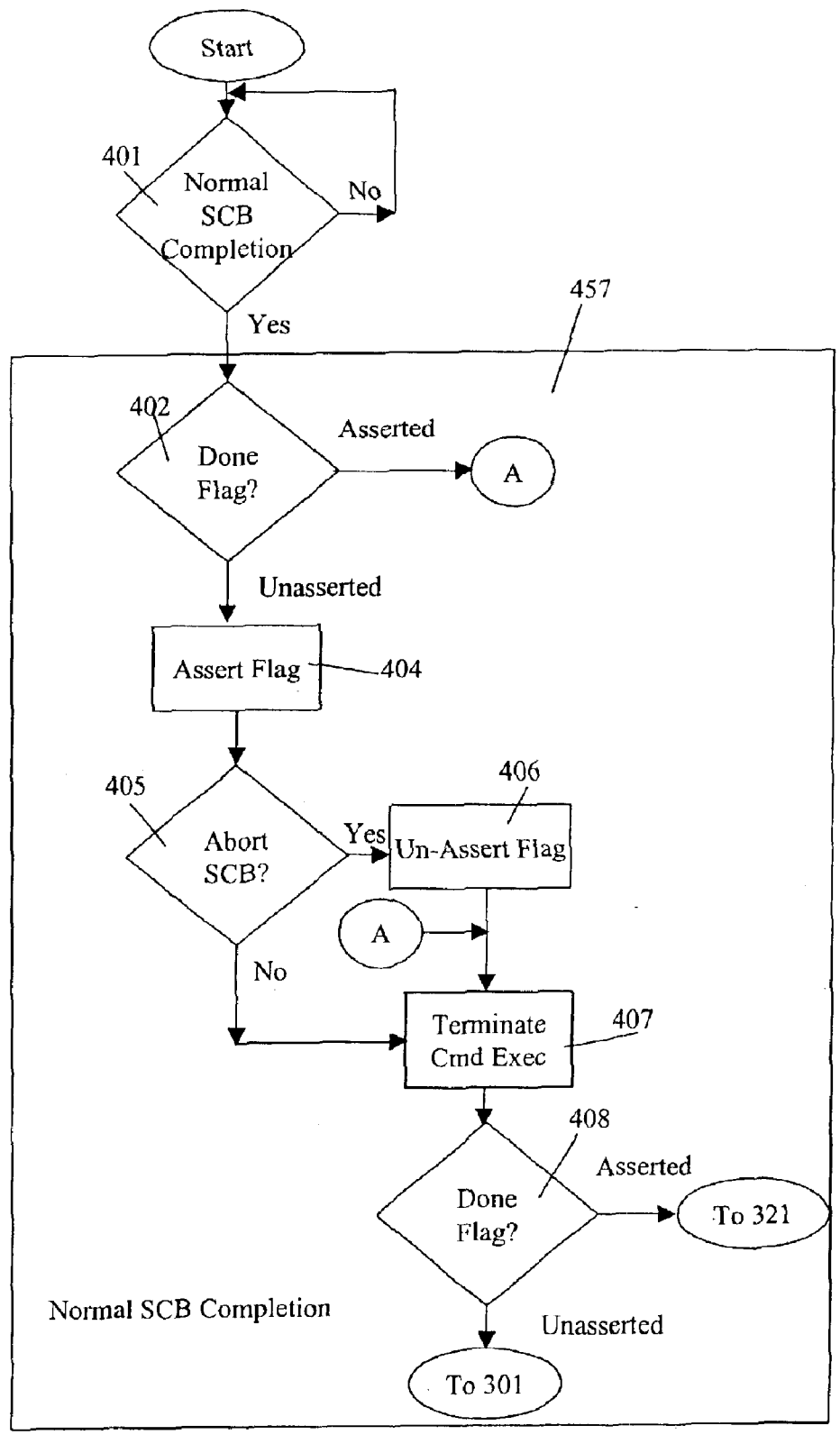
FIG. 4 is a process flow diagram for a normal SCB completion process according to one embodiment of the present invention.

When execution of a SCB completes normally, sequencer 120 executes normal SCB completion process 457 (FIGS. 1 and 4). In FIG. 4, normal SCB completion check operation 401 is used to indicate that normal SCB completion process 457 is not called until a SCB completes execution normally.

Done flag check operation 402 reads the state of done flag 176 in SCB 141 that has completed execution. If done flag 176 is asserted, SCB 141 is an aborting SCB, and the abortion operation has completed. Hence, check operation 402 transfers processing to terminate command execution operation 407 that terminates all sequencer operations associated with SCB 141.

Terminate command execution operation 407 transfers processing to done flag check operation 408. If done flag 176 is asserted, processing transfers to SCB activity terminated check operation 321 and otherwise transfers to target selection done operation.301 in this example.

If done flag 176 is unasserted, either SCB 141 is not an aborting SCB, or execution of the aborting SCB has not completed and processing transfers from done flag check operation 402 to assert flag operation 404. In assert flag operation 404, done flag 176 in SCB 141 is asserted, because in most instances SCB 141 is not an aborting SCB. Assert flag operation 404 transfers processing to abort SCB check operation 405.

Abort SCB operation check 405 examines the task attribute and task management fields of the SCB that completed normally to determine whether the SCB is an aborting SCB. If SCB 141 is an aborting SCB, check operation 405 transfers to un-assert flag operation 406 and otherwise transfers to terminate command execution operation 407. Un-assert flag operation 406, de-asserts done flag 176 and transfers to terminate command execution operation 407 that was described above.

Alternatively, if abort SCB check operation 405 finds that the SCB is an abort SCB, check operation 405 could look in SCB execution queue 135 and if the abort SCB was still in execution queue 135, remove the abort SCB from queue 135. In this case, check operation 405 would transfer to terminate command execution operation 407, because it would not be necessary to wait for the abort command to complete.

SCB activity terminated check operation 321 waits until all activity associated with a SCB is terminated. When all activity is terminated, sequencer 120 appends the SCB to SCB done queue 130. In one embodiment, check operation 321 is true when (i) all data transfers to the host for the SCB are terminated; (ii) the SCSI target has terminated execution of the command in the SCB, sometimes stated as terminated execution of the SCB; (iii) sequencer 120 has completed execution of the original command in the SCB; and (iv) sequencer 120 has completed execution of the abort request if the abort request is included in the SCB.

When SCB activity is terminated check operation 321 is true, the done flag in the SCB has been asserted for both normal and aborting SCBs, and processing transfers to update done queue operation 322 in all execution complete process 330. Update done queue operation 322 appends the SCB to SCB done queue 130 and transfers processing to notify host operation 323.

Notify host operation 323 moves the contents of SCB done queue 130 to SCB done queue 174 and generates an interrupt to host adapter manager 162. When host adapter manager 162 receives the interrupt, there is no ambiguity and all activity associated with the SCB has been completed and/or terminated. The SCB ID can be reallocated by host adapter manager to SCB sites 172 and reallocated by host adapter manager to a new SCB for delivery to SCB array 140.

If target I/O device 192 continues with normal command execution before host adapter 100 can reselect target I/O device 192 again, sequencer 120, in one embodiment, executes the normal attempts to abort the execution of the target I/O command. For example, for parallel SCSI host adapters, sequencer 120 asserts attention signal ATN on bus 191 and listens for target I/O device 191 to transition to bus phase Message Out. If target I/O device does transition to bus phase Message Out, sequencer 120 sends the abort message. Alternatively, sequencer 120 waits for target I/O device 192 to disconnect from bus 191.

In the example of FIG. 1, a single sequencer is illustrated. In another embodiment, automated hardware is used to send an abort SCB to the target. Alternatively, another sequencer could function in parallel with sequencer 120 and handle the operations associated with the abort SCBs.

Herein, when it is indicated that host system 150, sequencer 120, and/or host adapter 100 takes an action, those of skill in the art will understand that either an instruction or instructions are executed by a processor that in turn results in the action, or alternatively, automated hardware performs operations that result in the action. The particular technique used to implement the action is not essential to this invention.

The serial sequences of operations in FIG. 2 to 4 are illustrative only and are not intended to limit the invention to these particular embodiments. Each sequence of operations also is only illustrative. Those of skill in the art will be able to implement various sequences of operations that achieve the advantages of this invention in view of this disclosure.

The particular method used to transfer the SCBs of this embodiment of the invention from host memory 150 to SCB array 140 is not essential to the invention. However, one way suitable for use in this invention is presented in U.S. Pat. No. 6,006,292, entitled "Method of Managing Hardware Control Blocks Utilizing Endless Queue Maintained to Never be Empty and Containing Tail Pointer Only Accessible by Process Executing on System Processor," of B. Arlen Young issued on Dec. 21, 1999, and incorporated herein by reference in its entirety.

The processes of this invention, in one embodiment, are stored as executable instructions in a memory and upon execution of the executable instructions, the process is performed. This memory can be either a single memory unit or multiple memory units.

For example, in one embodiment of the present invention, a memory contains processor instructions for a command abort process. Upon execution of the processor instructions the command abort process includes:

determining whether a hardware I/O command block including a target I/O command to be aborted is in a host adapter execution queue;

removing the hardware I/O command block from the execution queue upon the determining finding that the hardware I/O command block is in the host adapter execution queue; and determining a state of a done flag in the hardware I/O command block upon the determining finding that the hardware I/O command block is not in the host adapter execution queue.

In one embodiment, the method also includes modifying the hardware I/O command block to include an abortion command for the target I/O command upon the determining the state of the done flag finding that the done flag is unasserted. The method further includes scheduling the hardware I/O command block for execution by the host adapter following the modifying the hardware I/O control block to include the abort command.

In view of this disclosure, those of skill in the art can implement target I/O command abortion for a variety of different target I/O devices. For example, the use of SCSI devices is illustrative only and is not intended to limit the invention to such devices.

I claim:

1. A method comprising:

receiving, by a host adapter, a hardware I/O command block including a target I/O command for a target I/O device;

modifying said hardware I/O command block to include an abort command; and checking a state of a flag in said hardware I/O command block to determine whether both said abort command and said target I/O command have completed.

2. The method of claim 1 further comprising:

scheduling said hardware I/O command block for execution by said host adapter following said modifying.

3. The method of claim 1 wherein said modifying does not affect information is said hardware I/O command block for said target I/O command.

4. The method of claim 1 wherein said modifying is performed by a host adapter manager executing on a host system.

5. The method of claim 1 wherein said modifying is performed by a sequencer of said host adapter.

6. The method of claim 1 further comprising:

notifying a host system of completion of both said abort command and said target I/O command when said flag has an asserted state.

7. The method of claim 6 further comprising:

leaving said flag asserted only following completion of execution of both said abort command and said target I/O command.

8. A method comprising:

receiving, by a host adapter, a hardware I/O command block including a target I/O command for a target I/O device;

modifying said hardware I/O command block to include an abort command;

scheduling said hardware I/O command block for execution by said host adapter following said modifying;

checking a state of a flag in said hardware I/O command block to determine whether both said abort command and said target I/O command have completed; and notifying a host system of completion of both said abort command and said target I/O command when said flag has an asserted state.

9. The method of claim 8 wherein said modifying does not affect information is said hardware I/O command block for said target I/O command.

10. The method of claim 8 wherein said modifying is performed by a host adapter manager executing on a host system.

11. The method of claim 8 wherein said modifying is performed by a sequencer of said host adapter.

12. The method of claim 8 further comprising:

leaving said flag asserted only following completion of execution of both said abort command and said target I/O command.

13. A method comprising:

configuring a done flag in a hardware I/O control block, which includes a target I/O command, to a first state wherein said first state indicates said target I/O command has not been executed by a host adapter; and configuring said hardware I/O control block to include an abort command for said target I/O command wherein said hardware I/O control block includes both said target I/O command and said abort command.

14. The method of claim 13 further comprising:

configuring said done flag to a second state upon completion of said target I/O command and said abort command.

15. The method of claim 13 further comprising:

scheduling said hardware I/O command block for execution by said host adapter following said configuring said hardware I/O control block to include said abort command.

16. The method of claim 13 further comprising:

determining whether both said abort command and said target I/O command have completed.

17. The method of claim 16 wherein said determining further comprises:

checking a state of said done flag in said hardware I/O command block.

18. The method of claim 17 further comprising:

notifying a host system of completion of both said abort command and said target I/O command when said done flag has a second state.

19. A method comprising:

configuring a done flag in a hardware I/O control block, which includes a target I/O command, to a first state wherein said first state indicates said target I/O command has not been executed by a host adapter;

configuring said hardware I/O control block to include an abort command for said target I/O command wherein said hardware I/O control block includes both said target I/O command and said abort command;

scheduling said hardware I/O command block for execution by said host adapter following said configuring said hardware I/O control block to include said abort command;

determining whether both said abort command and said target I/O command have completed; and configuring said done flag to a second state upon completion of said target I/O command and said abort command.

20. The method of claim 19 wherein said determining further comprises:

checking a state of said done flag in said hardware I/O command block.

21. The method of claim 20 further comprising:

notifying a host system of completion of both said abort command and said target I/O command when said done flag has a second state.

22. A method comprising:

determining whether a hardware I/O command block including a target I/O command to be aborted is in a host adapter execution queue;

removing said hardware I/O command block from said execution queue upon said determining finding that said hardware I/O command block is in said host adapter execution queue; and determining a state of a done flag in said hardware I/O command block upon said determining finding that said hardware I/O command block is not in said host adapter execution queue.

23. The method of claim 22 further comprising:

modifying said hardware I/O command block to include an abortion command for said target I/O command upon said determining said state of said done flag finding that said done flag is unasserted.

24. The method of claim 23 further comprising:

scheduling said hardware I/O command block for execution by said host adapter following said modifying said hardware I/O control block to include said abort command.

25. A method comprising:

using a single hardware I/O command block structure for both a target I/O command and an abortion command for said target I/O command; and asserting a done flag in said single hardware I/O command block structure when both said target I/O command and said abortion command for said target I/O command are completed.

* * * * *